(No Model.) 6 Sheets—Sheet 1.
J. F. S. BRANTH.
TROLLEY SUPPORT FOR ELECTRIC RAILWAY CARS.
No. 579,380. Patented Mar. 23, 1897.

(No Model.) 6 Sheets—Sheet 2.

J. F. S. BRANTH.
TROLLEY SUPPORT FOR ELECTRIC RAILWAY CARS.

No. 579,380. Patented Mar. 23, 1897.

WITNESSES:

INVENTOR

BY

ATTORNEYS.

(No Model.) 6 Sheets—Sheet 4.

J. F. S. BRANTH.
TROLLEY SUPPORT FOR ELECTRIC RAILWAY CARS.

No. 579,380. Patented Mar. 23, 1897.

WITNESSES:

INVENTOR

BY

ATTORNEYS.

(No Model.)

6 Sheets—Sheet 5.

J. F. S. BRANTH.
TROLLEY SUPPORT FOR ELECTRIC RAILWAY CARS.

No. 579,380.

Patented Mar. 23, 1897.

WITNESSES:

INVENTOR

ATTORNEYS.

(No Model.)  6 Sheets—Sheet 6.

J. F. S. BRANTH.
TROLLEY SUPPORT FOR ELECTRIC RAILWAY CARS.

No. 579,380. Patented Mar. 23, 1897.

WITNESSES: INVENTOR
Johan F. S. Branth
BY
ATTORNEYS.

UNITED STATES PATENT OFFICE.

JOHAN F. S. BRANTH, OF NEW YORK, N. Y., ASSIGNOR TO THE SPRAGUE ELECTRIC RAILWAY AND MOTOR COMPANY, OF SAME PLACE.

TROLLEY-SUPPORT FOR ELECTRIC-RAILWAY CARS.

SPECIFICATION forming part of Letters Patent No. 579,380, dated March 23, 1897.

Application filed November 20, 1888. Serial No. 291,368. (No model.)

*To all whom it may concern:*

Be it known that I, JOHAN F. S. BRANTH, a subject of the King of Sweden and Norway, residing at the city of New York, in the county and State of New York, have invented a certain new and useful Improvement in Trolley-Supports for Electric-Railway Cars, of which the following is a specification.

My invention relates to electric railways of that character in which current is conveyed to the motors which propel the cars by means of a contact device making an underneath contact with a conductor placed above the railway-line.

My object is to provide a simple and effective construction and arrangement for the contact device and the parts which support it, whereby such contact device may be adapted to change in direction of movement of the car; whereby the contact of such device with the overhead conductor will be constantly and effectively maintained; whereby danger to the line, if the contact device leaves it, and danger to the contact device from crossing lines will be avoided, and whereby the contact device will be allowed sufficient lateral movement to enable it to follow irregularities in the line of the conductor.

My invention consists in the novel devices and combination of devices employed by me in accomplishing the object above named, as hereinafter set forth and claimed.

My invention is illustrated in the accompanying drawings.

Figure 1:
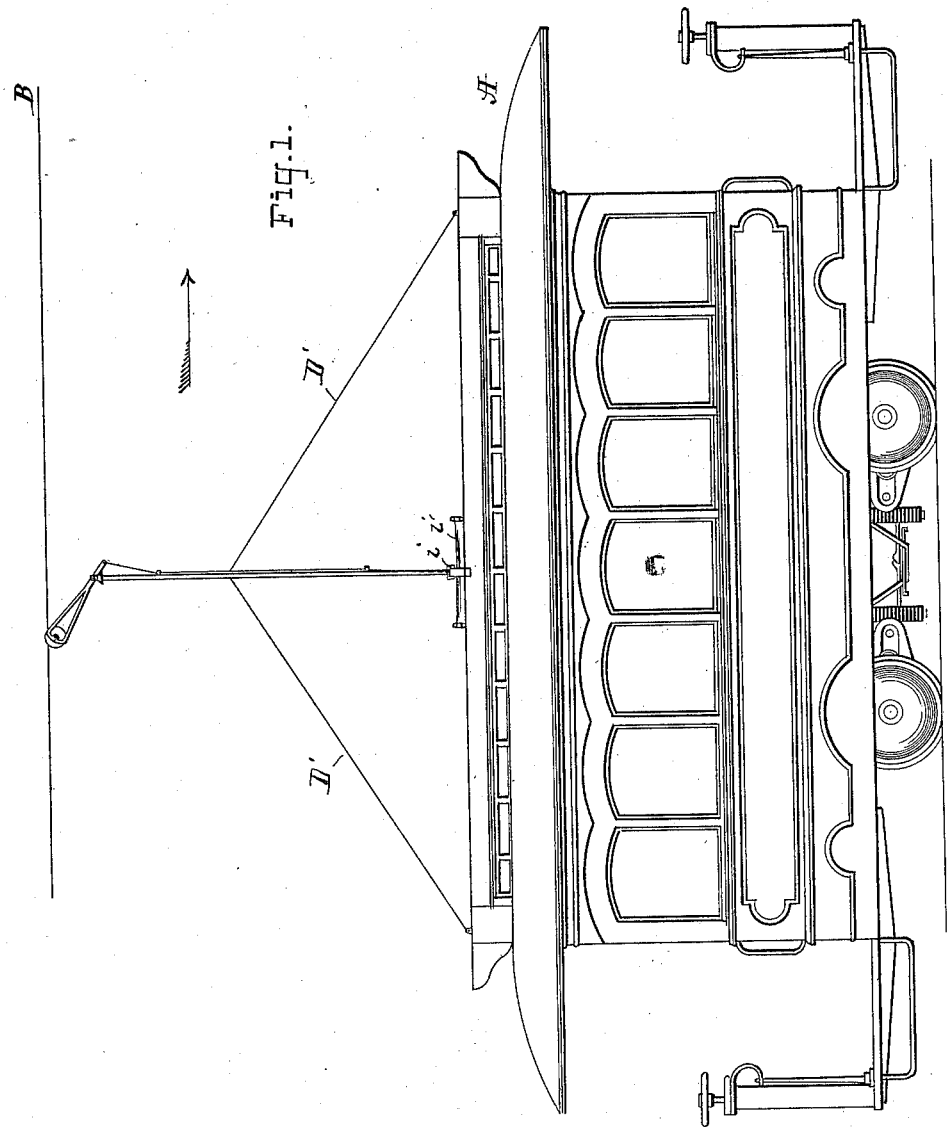
Figure 2:
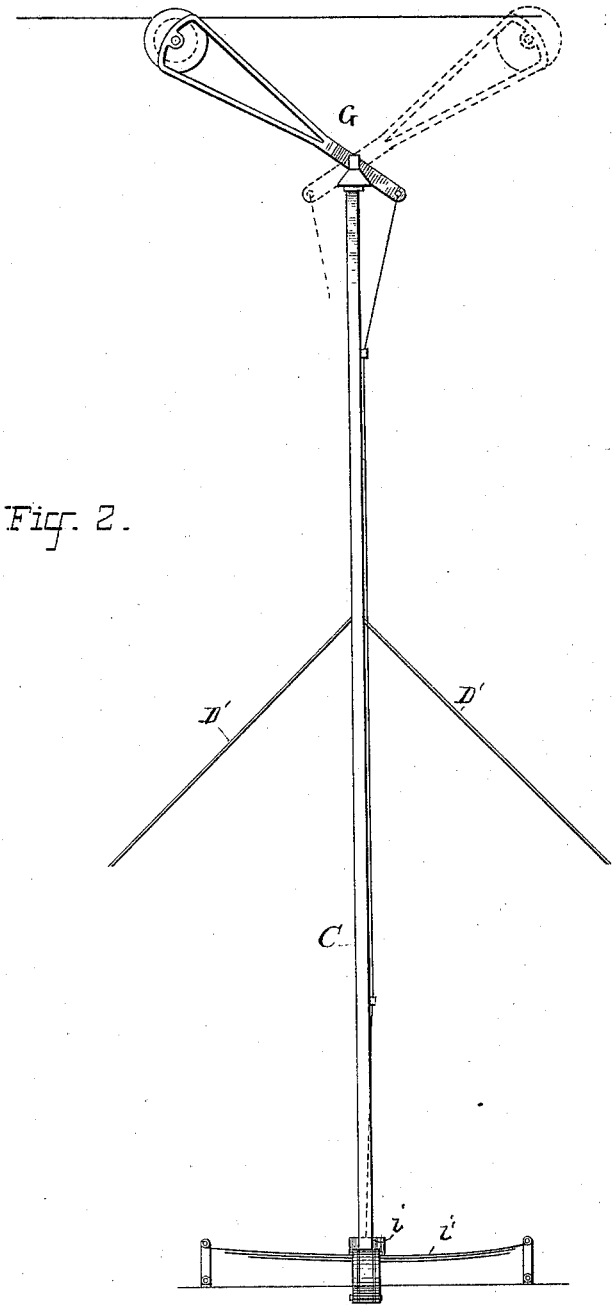
Figure 3:
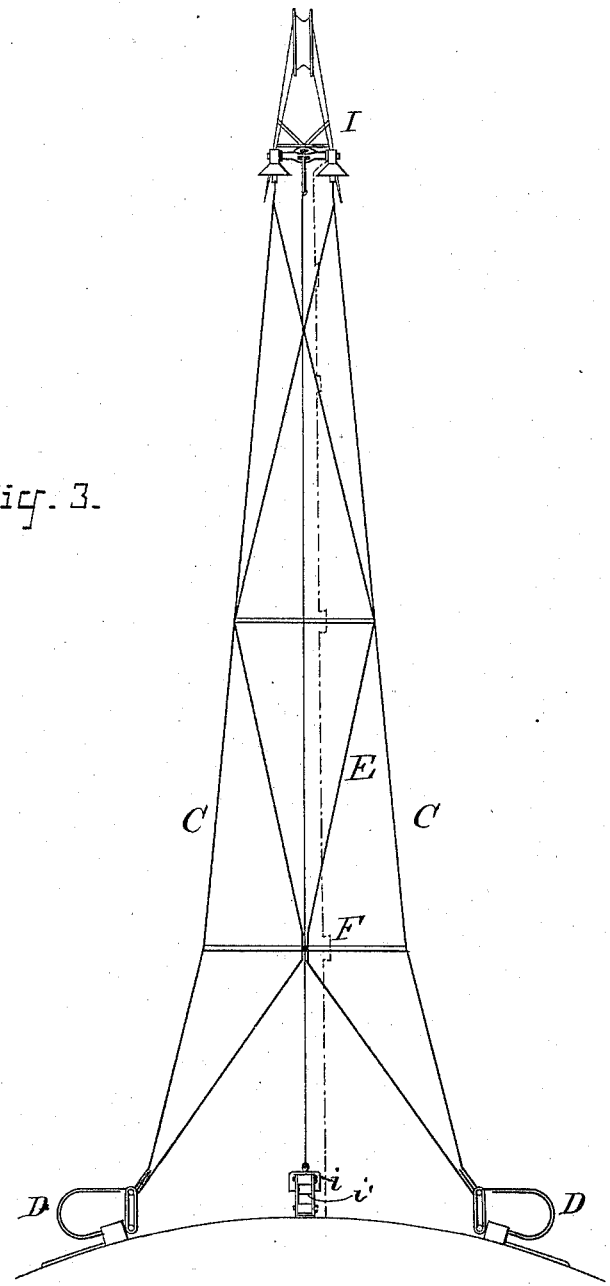
Figure 4:
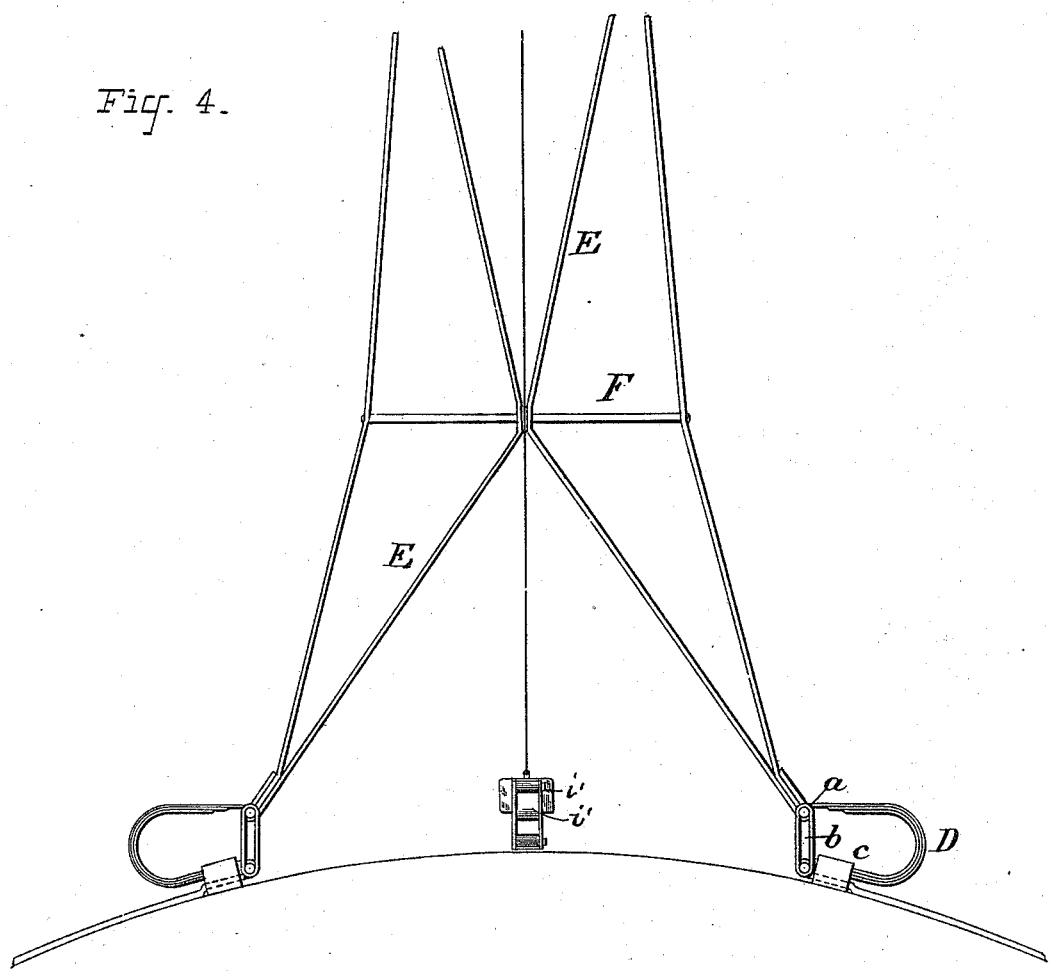
Figure 5:
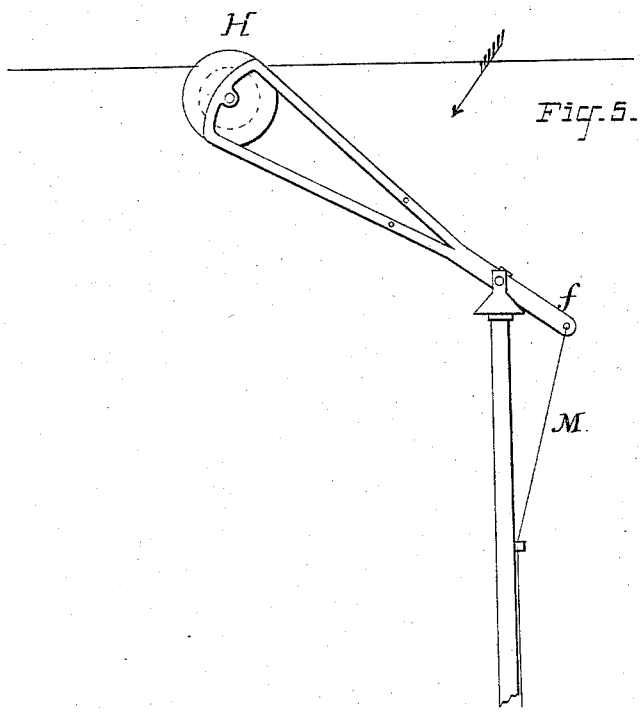
Figure 6:
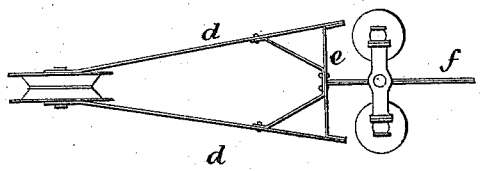
Figure 7:
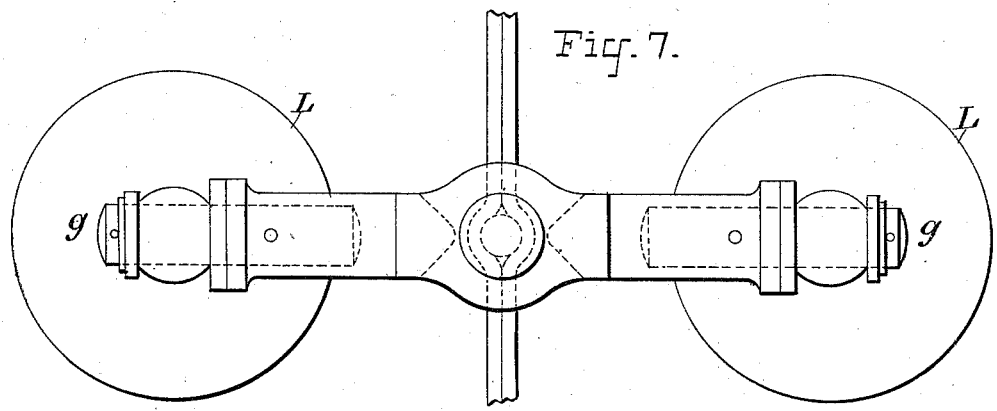
Figure 8:
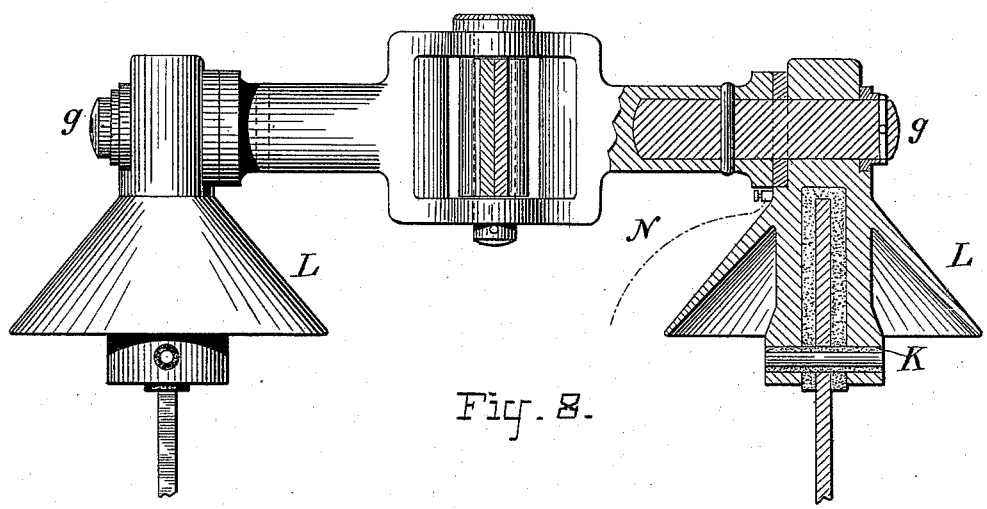

Figure 1 is a side elevation of an electric-railway car provided with a contact device embodying my invention; Fig. 2, a side view of the contact device and its support; Fig. 3, a front view of the same; Fig. 4, an enlarged front view of the lower portion of the support; Fig. 5, a side view of the contact device; Fig. 6, a top view of the same; Fig. 7, a top view of the vertical support; and Fig. 8, a front view of the upper portion of the same, partly in section.

A is an electric-railway car which, as will be understood, is provided with an electric motor for propelling it, the current for which is obtained from the overhead wire B. Upon the roof of the car is placed the support for the traveling contact device. This consists of two arms C C, each of which is supported upon curved springs D, being connected with such springs by pins $a$, which work in slots $b$, the springs being supported at their lower ends in blocks $c$ on the roof of the car. The side arms C C are connected by rods E and cross-arms F, which brace the structure and form a rigid framework which is relieved from the jar of the car by the springs D and is permitted by said springs to rock in a direction transverse to the car. The framework may have fore-and-aft stays D' attached to the car-roof.

The contact device is a grooved wheel or trolley H, which is carried by an arm consisting of two V-shaped side pieces $d$, one on each side of the trolley, the trolley being carried on a short spindle extending between the wide upper ends of said side pieces. These V-shaped side pieces, centrally between the wide ends of which is journaled the trolley-wheel, are substantially tangential to such trolley-wheel, having at their wide ends a width substantially equal to the diameter of the trolley-wheel. The side pieces $d$ diverge at their lower ends and are joined by a cross-piece $e$, from which extends an arm $f$, which passes through an aperture in the middle of the cross-piece I, at whose ends are pins $g$, which turn in bearings at the top of the side bars C C of the supporting structure. The trolley-arm is therefore capable of movement on a horizontal axis transverse to the car—viz., the cross-piece I turning at the top of the support C C—and is also capable of swinging on the axis formed by the arm $f$, which turns in the said cross-piece I. This axis $f$ is perpendicular to the horizontal transverse axis formed by the cross-piece I, and in the upright position of the trolley-arm is parallel with the car-roof and arranged longitudinally with reference thereto. In the operative position of the trolley-arm this axis $f$ is also substantially longitudinal with relation to the car, although more or less oblique to the same vertically, according to the inclination of the trolley-arm. The cross-piece I is insulated from the side bars C C by interposed sections of suitable insulating material K, and these parts are protected from moisture by flaring flanges or hoods L.

Attached to the lower end of the arm $f$ is a line or cord M, which hangs down to the roof of the car and carries at its end a weight $i$, which overbalances the weight of the trolley and keeps the trolley pressed constantly against the overhead wire B, such weight $i$ being cushioned by resting on a curved flat spring $i'$. The current is taken from the metal trolley-arm by a suitable insulated wire N, attached thereto at any suitable point and extending down to the motor upon or within the car.

The flaring side pieces on each side of the trolley form a guard for preventing the bearings of the trolley from catching in the wire when the trolley accidentally leaves the wire. It will be seen that if the trolley becomes displaced the weight $i$ will throw the trolley up above the line B, and there might be danger of the line catching in the bearings of the trolley, but the flaring side pieces will engage the line and guide the trolley to one side of it. Due to the V shape of the side pieces of the frame which forms the trolley-arm and the fact that the trolley-wheel is journaled centrally between the separated ends of the V and that the sides of the V form tangents to the wheel, danger of the trolley catching in any cross-wire which may cross the line is avoided, since such cross-line will be caught upon the side pieces and the trolley will be depressed and pass under it without engaging with it.

When the direction of the movement of the car is changed, the trolley-frame is thrown over and the position of the trolley reversed.

What I claim is—

1. In a trolley or current-collector for electric-railway cars, the combination of a support mounted upon the car-roof and adapted to have a transverse rocking motion thereon, and a trolley-arm pivoted upon said support on axes perpendicular to each other, one of which is horizontal and transverse to the car, substantially as set forth.

2. In a trolley or current-collector for electric railways, the combination of a rocking vertical support attached to the car-roof, and of a length sufficient to almost reach the overhead conductor, and a short arm pivoted upon said support and carrying a contact device, substantially as set forth.

3. In a trolley or current-collector for electric-railway cars, the combination of a rocking vertical support attached to the car-roof and of a length sufficient to almost reach the overhead conductor, and a short trolley-arm pivoted upon the top of said support by two axes perpendicular to each other, one of which is horizontal and transverse to the car, substantially as set forth.

4. The combination with a trolley-wheel, of side pieces between which the wheel is journaled, each side piece having a V shape, and the trolley-wheel being journaled centrally between the wide ends of the V, substantially as set forth.

5. The combination with a trolley-wheel, of V-shaped side pieces centrally between the wide ends of which the trolley-wheel is journaled, such side pieces having a width at their outer ends substantially equal to the diameter of the trolley-wheel and forming tangents to such trolley-wheel, substantially as set forth.

6. The combination with a trolley-wheel, of side pieces between which the wheel is journaled, diverging outwardly from said wheel and away from each other, substantially as set forth.

7. A trolley-arm comprising a frame with diverging V-shaped side pieces, such side pieces being nearest together at the wide ends of the V, and a trolley-wheel journaled centrally between such side pieces at their wide ends, substantially as set forth.

8. The combination with an electric-railway car, of a trolley supported thereby, and curved plate-springs upon which the support rocks, substantially as set forth.

9. The combination with an electric-railway car and an overhead line of a branching support, each leg of the support being flexibly supported, and a trolley carried upon said support making underneath contact with said line, substantially as set forth.

10. The combination with an electric-railway car and an overhead line of a branching support, a spring for each leg of said support, pins connecting the legs of the support and springs and a trolley carried upon said support making contact with said line, substantially as set forth.

11. The combination with an electric-railway car and an overhead line of a flexibly-supported support, an inclined arm thereon carrying a trolley making underneath contact with said line and a weight connected with said inclined arm flexibly cushioned, substantially as set forth.

This specification signed and witnessed this 20th day of October, 1888.

JOHAN F. S. BRANTH.

Witnesses:
 H. W. SEELY,
 WILLIAM PELZER.